United States Patent [19]

Stievenart et al.

[11] 4,047,193
[45] Sept. 6, 1977

[54] APPARATUS FOR OPENING RADIOGRAPHIC CASSETTES

[75] Inventors: Emile Frans Stievenart, Hoboken; Hendrik Sylvester Plessers, Boechout; Georges Jozef Neujens, Merksem; Leo Paul Van Bouwel, Mortsel, all of Belgium

[73] Assignee: AGFA-GEVAERT N.V., Mortsel, Belgium

[21] Appl. No.: 592,879

[22] Filed: July 3, 1975

[30] Foreign Application Priority Data

July 5, 1974 United Kingdom .............. 29998/74

[51] Int. Cl.² .................. G03B 17/24; G11B 1/02
[52] U.S. Cl. .................................. 354/105; 250/468; 250/475; 250/481
[58] Field of Search .............. 354/312, 310, 316, 322, 354/276, 277, 105; 355/3 R, 10; 250/468, 471, 470, 475, 476, 481; 219/216

[56] References Cited

U.S. PATENT DOCUMENTS

| 3,650,620 | 3/1972 | Hoyt ................................. 355/3 R |
| 3,683,182 | 8/1972 | Farmer .............................. 250/468 |
| 3,769,897 | 11/1973 | Zwettler ........................... 354/322 |
| 3,842,282 | 10/1974 | Shimoda ............................ 250/468 |
| 3,900,405 | 8/1975 | Bartlett ............................ 250/468 |
| 3,920,991 | 11/1975 | Baker et al. ..................... 250/468 X |
| 3,964,107 | 6/1976 | Stievenart et al. ............... 250/468 |

*Primary Examiner*—Edna M. O'Connor
*Attorney, Agent, or Firm*—William J. Daniel

[57] ABSTRACT

An apparatus for unloading radiographic cassettes under daylight conditions comprises an inclined tunnel-shaped body which may be mounted at the front side of a processing machine. Within the tunnel-shaped body an automatic unlocking mechanism is provided which unlocks and opens the cassette to be unloaded so that the film falls out of the opened cassette under the force of gravity and is presented at the entrance slot of the processing machine in order to undergo the required chemical treatment.

8 Claims, 8 Drawing Figures

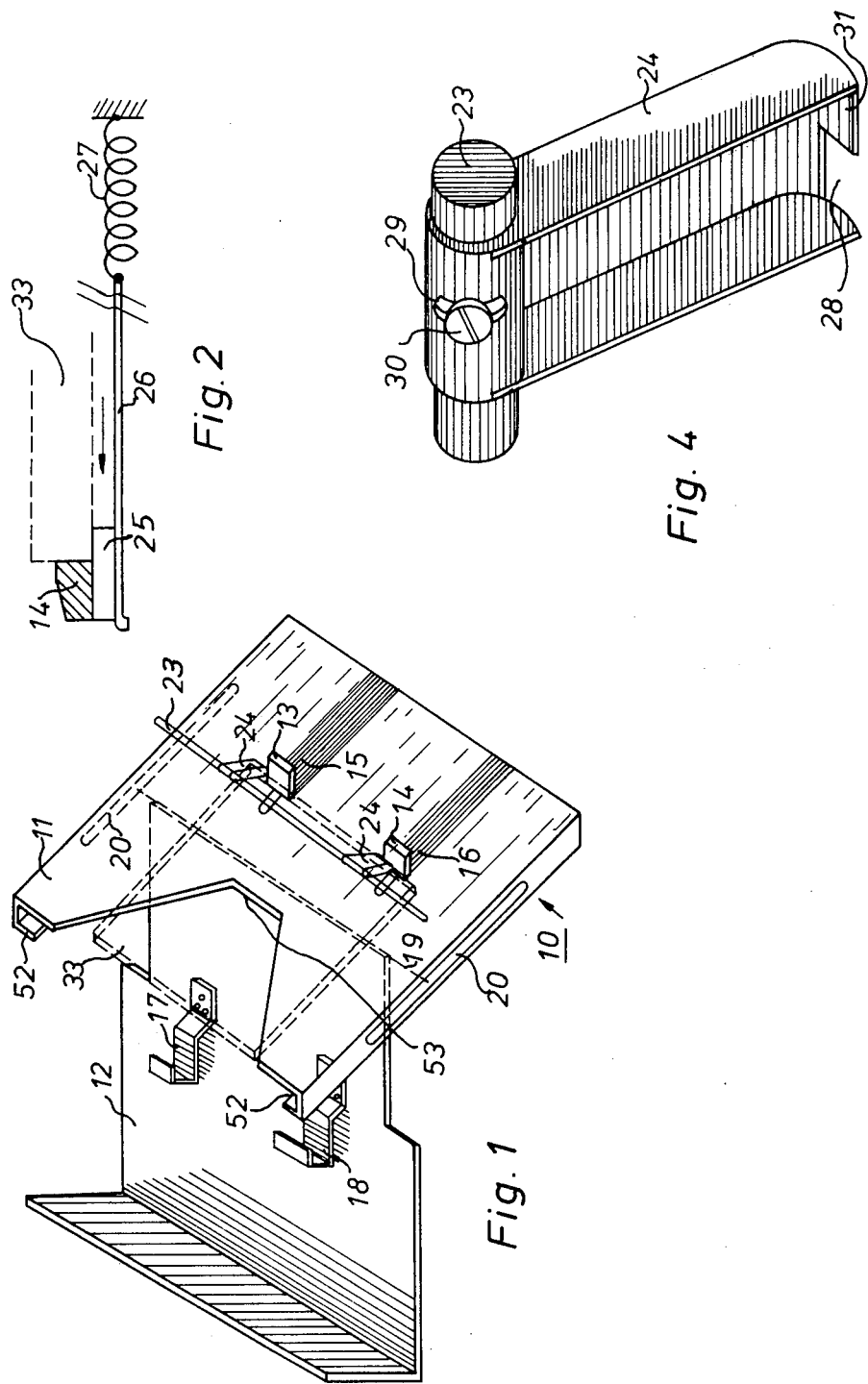

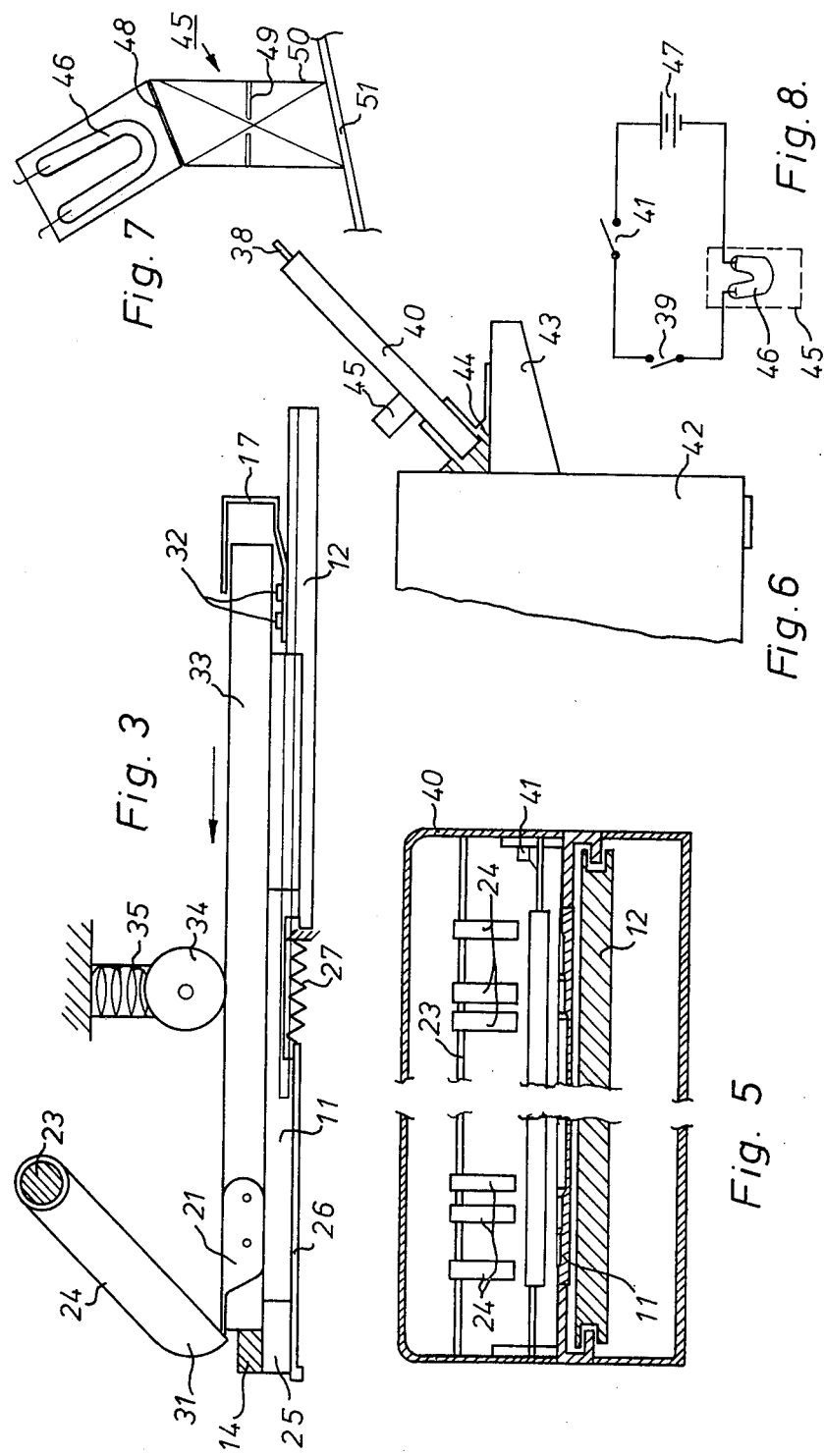

APPARATUS FOR OPENING RADIOGRAPHIC CASSETTES

This invention relates to apparatus for automatically unlocking and opening radiographic film cassettes.

The need for such apparatus arises, e.g. in hospitals and other places where exposed radiographic film sheets have to be quickly processed, often in rapid succession, and with the minimum of manual handling. The automatic unlocking and opening mechanism should enable cassettes to be fed into it and should operate to open the cassettes while they are in a predetermined location so that the film sheets are properly located preparatory to a subsequent automatic operation. For example the automatic unlocking and opening apparatus may be used in conjunction with an automatic film processing machine to which the exposed film sheets transfer or are transferred automatically from the opened cassettes. The invention provides apparatus which may be used in conjunction with such an automatic film processing machine. The apparatus also has other uses. For example the apparatus may be used in situations where cassettes containing radiographic film sheets have only to be temporarily opened, for the purpose of recording data, e.g. the name of a patient, on the film sheets or for some other purpose.

Cassette unlocking and opening apparatus are already known but these known apparatus are rather complex and are more particularly suitable for use in conjunction with high capacity film processors such as are used in centralised processing departments serving an entire hospital.

The present invention provides apparatus of a more simple construction which is better suited for smaller work volumes. The apparatus may for example find very useful application in conjunction with automatic processing machines operating in or adjacent an operating theatre to permit rapid access to radiographs taken in the course of a surgical operation.

According to the present invention there is provided a cassette unlocking and opening apparatus for unlocking and opening radiographic cassettes having a uniform locking-unlocking mechanism in the form of levers with which mechanical elements can co-operate to bring about unlocking, opening, closing and relocking of the cassettes, wherein said apparatus comprises:

an entrance opening a platform located after said entrance opening which is provided with a plurality of ladder-like guides in order to bring the cassettes of different formats into the apparatus in a symmetric position with reference to a center line, said ladder-like guides ending together in one plane, so that the front edges of all cassettes are positioned at the same reference line, at least one pressure member urging on the cover of said cassette when the latter is brought into the apparatus to keep the cassette into contact with its corresponding ladder-like guide and to close the cassette upon withdrawing same from the apparatus, a rabbet in order to arrest the front-edge of the cassette, said rabbet being displaceable in the direction according to which said cassette is introduced into the apparatus and perpendicularly positioned upon said direction, spring means in order to displace said rabbet in the direction of introduction of the cassette, wherein the spring load is such that skew introduction of the cassette as a consequence of improper positioning of the front edge of the cassette against said rabbet is greatly reduced and wherein a fully introduced and opened cassette upon release by the operator is pushed back over at least such a distance that it is closed by said pressure member and means engaging the locking/unlocking mechanism of said cassettes, which means comprises hook-shaped members which are mounted for limited rotation and capable to intercept and engage the cassette lever(s), and which on account of that engagement upon the further introduction of the cassette causes a displacement of said levers involving the locking components to be displaced so that the lock is released and the cassette section carrying that component is hinged open.

By such an apparatus a cassette can be automatically opened at a predetermined spatial location by placing the cassette on the cassette support and pushing the cassette forwardly along the path defined by the guide means.

The invention is primarily intended to be embodied as an apparatus wherein the cassettes have to be advanced along said support by hand. However the invention includes within its scope apparatus as above defined and associated with automatic pushing means for advancing the cassettes.

Concerning the unlocking member(s): the number of such members and their disposition across the advance path of the cassettes depends on the number of locks on the cassettes to be opened, and their distribution across the leading (opening) end of the cassette. For opening cassettes with a single central lock only one unlocking member, centrally located with respect to the width of such path is required. Usually cassettes have two locks symmetrically disposed abreast of the centre of the opening end of the cassette so that two unlocking members, similarly disposed in relation to the central forward axis of the guide path, are required. For convenience it will hereafter be assumed that there is more than one unlocking member.

Further concerning the unlocking members: the shaping, displaceable mounting and disposition of such members in a way which permits them to co-operate with and to displace, in the specified manner, cassette locking components of any given type, presents no difficulty. Preference is for unlocking members mounted for rotation about a transverse axis under the forward thrust of the lock components when they engage such members. The points of engagement between the lock components and the unlocking members then follow an upward arcuate path as the cassette continues to advance. For the types of cassette lock mostly used, it is suitable to employ unlocking members having hooked ends. Such hooked ends can engage portions of lock components projecting forwardly from the leading end of a cassette.

The said cassette support may be fixed or it may consist of or include an element which is mounted for forward displacement to carry the cassette forwardly along the guide means for unlocking and opening. For example the support may comprise a fixed section and a slidable section on which the cassette or at least a rearward portion of it is initially supported and which carries abutment means which co-operates with the rear of the cassette to cause it to be propelled forwardly when such slidable section is advanced.

The following are further optional but advantageous features any one or more of which may be incorporated in an apparatus according to the invention:

a. spring means which is energised by the forward motion of the cassette so that on release of the forward pressure which is exerted on the cassette to cause its advance and opening, the cassette automatically retracts and is consequently closed;

b. laterally spaced spring-loaded abutments which lie in the path of the front end of the tray or receptable section of the cassette during its advance and assist in correcting any "skewing" of the cassette before it reaches the unlocking position. (These spring-loaded abutments may suffice to provide feature (a) above);

c. a pressure member which is elastically urged against the lid or cover section of a cassette during its advance and opening and which consequently assists closing of the cassette during retraction or withdrawal along the guide means;

d. a plurality of lateral guides at different lateral distances from the central forward axis of the advance path for the cassettes, the different said guides being located to suit cassettes of different widths;

e. the provision of light-excluding or light-screening means which enables the opening of cassettes by the apparatus to take place in day-light. Such means may, e.g. take the form of a light-tight enclosure within which the cassette unlocking and opening mechanism is disposed;

f. an associated automatic recording device for automatically recording data on a film sheet while the cassette is held open. Such recording device may e.g. be triggered by a part of the cassette opening apparatus e.g. by a pressure member (feature (c)).

In all cases it is desirable for there to be a standard position at which the unlocking action in respect of any cassette advanced along the guideway commences. So, a plurality of guide means may be provided in supplement to suit different cassette widths, which guide means may terminate in a common plane.

Apparatus according to the invention may be incorporated as part of or be mounted on automatic film processing apparatus. To achieve automatic unloading of the cassettes, unloading mechanism may be provided for taking hold of the film sheet in the opened cassette and removing the film sheet. If such a mechanism is employed the cassettes may be in a horizontal position when they are unlocked and opened. However, apparatus according to the invention may be constructed or mounted so that it opens cassettes while they are in an inclined position so that as a cassette is opened the film sheet slides out of the cassette under gravity.

Appratus according to the invention is particularly useful for opening radiographic cassettes as described in our co-pending U.K. Patent Application No. 60344/71. However the apparatus can very easily be constructed to suit other types of cassettes.

Certain embodiments of the invention, selected by way of example, will now be described with reference to the accompany diagrammatic drawings, in which:

FIG. 1 is an isometric view of a cassette unlocking and opening apparatus according to the invention.

FIG. 2 shows a detail of the apparatus of FIG. 1.

FIG. 3 shows a cross-sectional view of another cassette unloading apparatus embodying the invention.

FIG. 4 is a detail of the apparatus of FIG. 3.

FIG. 5 is a cross-sectional view of an apparatus according to the invention when the latter is mounted in a light-tight tunnel.

FIG. 6 shows how the apparatus of FIG. 5 may be connected to a processing apparatus.

FIG. 7 shows an elementary apparatus for impressing additional data on the film to be processed and which may be incorporated into an apparatus according to the invention and FIG. 8 is a view on a detail of FIG. 7.

As may be seen in FIG. 1, the apparatus 10 according to the invention comprises two main parts: a platform 11 which is mounted in slanting position and a platform 12 which hinges around a shaft 19, the latter itself being capable to perform a parallel displacement with respect to the platform 11. This may be carried out, for example, by providing a slot 20, in each side wall of the platform 11.

The platform 12, which is a kind of slide, is provided with two carriers 17, 18 which are fixedly secured to it. Said carriers 17, 18 are positioned in such a way that they are capable of urging against the rear edge of a cassette (not shown) which lies on the first platform 11, after the platform 12 has performed a partial rotation in upward direction and that its side-projections have disappeared in the grooves 52, 52 at the side walls of the platform 11.

The cassette (shown in dotted lines) is laid onto the inclined platform 11 and is arrested by a pair of rabbets 13, 14 which are resiliently mounted in grooves 15, 16 provided in said platform 11. It is to be noted that the distance between said rabbets should at least be somewhat less than the width of the cassette which is to be placed on it, in order to provide sufficient support for said cassette. When the apparatus is designed for being used in combination with a plurality of cassette formats, said distance should be somewhat smaller than the width of the smallest format. The height of said rabbets 13, 14 may not exceed that of the bottom frame of the cassette in order not to obstruct the passage of a film falling out of the cassette by the force of gravity. The positioning of the cassette on the platform 11 will be more clearly deduced from the later description of FIG. 5.

Transversally extending over the width of the cassette unloader there is a shaft 23, to which a plurality of hook-shaped members 24 are mounted for limited rotation. The purpose of these members is to provide a member capable of intercepting the lever(s) of the cassette to be opened. Further details thereof can be appreciated from FIGS. 3 and 4.

Again referring to FIG. 1, it may be noted that in the upper portion of platform 11, a recess 53 is provided in order to permit free passage of the carriers 17, 18 when the latter move in downward direction. It will be appreciated that instead of a V-shaped portion also a rectangular recess of sufficient length situated in front of each carrier may be used to suit this purpose.

The cassette positioning means are represented in partial cross-sectional view in FIG. 2. The rabbet 14 is sealed to a block 25, which fits into the slot 16 (FIG. 1) and the whole is supported by a rod 26 which is capable to move in the direction of the arrow, but which is retained by a spring 27, which—due to its resilience—keeps the rod 26 in its uppermost position. The spring 27 is connected to the frame of the apparatus.

The rabbets serve the purpose of alignment of the cassette 33. Another aim is to provide an easy mechanism for pushing the (empty) cassette out of the cassette opener once the opening cycle is carried out. Therefore, the springs 27 show a resilience which is sufficiently high that upon release of the cassette by the operator, the whole unit takes its upper limit position whereby the cassette is closed (see further). The relatively strong springs 27 take care of compensating an occasional skew introduction of the cassette.

In FIG. 3 is shown a horizontal type of an apparatus according to the invention. It differs from that in FIG. 1 in that the platform 12, on which the cassette 33 is placed, is in a horizontal position and is no longer hingedly connected to the platform 11, but stays in movable parallel relationship thereto.

As may be derived from FIG. 3, the lever 21 of the cassette, which in the position as shown, keeps the cover of the cassette 33 in locked position, may be intercepted and seized by the hook-shaped members 24. When pushing the platform 12 and the cassette 33 lying on it in a sense denoted by the arrow, the rabbet 14 is forced to follow a path in the same direction, because the cassette 33, urging against said rabbet 14 is fixedly held to the platform 12 with the help of the carrier 17.

Due to this fact, the hook-shaped members 24 which intercept the lever 21 start to rotate around the shaft 23, but as the levers are forced into the members 24, they will be gradually lifted, causing the cassette 33 to be unlocked and its lid or cover to be opened as the platform 12 is pushed further forward to the limit of its travel until the hook-shaped member 24 reaches the upper limit of its course. As may be derived from FIG. 3, also a roller 34, which is yieldingly urged against the cover of the cassette 33 by means of a spring 35, is provided. The purpose of said roller 34 is to secure a firm contact between the cassette and the platform 11 and to take care of the relocking of the cassette cover, by reversing the lever 21 to its initial position upon withdrawal of the cassette. Another reason for the presence of said roller is that it may be advantageously used for the purpose of energizing a micro-switch or other electric or electronic device to provide a visible or audible signal indicating the good or bad functioning of the apparatus.

FIG. 4 shows a hook-shaped member 24 more in detail. Said member is rotatably mounted onto a shaft 23. The ring-like structure by means of which it is mounted thereon is provided with a slot 29 extending over part of its periphery, so that after a bolt 30 is screwed into the shaft 23, the member 24 may perform a partial rotation over, say 90°. In this way the upper and lower limits of its course are clearly determined. At its free extremity the hook-shaped member 24 is provided with a recessed portion 28, so that a hook 31 is obtained, which serves to intercept the lever of a cassette.

When using the apparatus in combination with an automatic processing apparatus, located in daylight, the unlocking and opening of a radiographic film cassette must occur in dark room conditions. To this end a tunnel 40 may be provided around the mechanism, said tunnel being in direct connection with the entry-slit of a processing apparatus. It may be noted that the tunnel may be a rigid or a non-rigid structure. A said rigid structure may form an integral part of the unlocking and opening apparatus. A non-rigid light-screen may, e.g. take the form of a tube of a flexible light-tight material which hangs loosely over the entrance of the cassette unlocking and opening apparatus.

The cross-sectional view of such a unit is presented in FIG. 5. It may be noted that the platform 11 is provided with a groove of varying depth in order to provide a plurality of recesses or guideways in which cassettes of varying format may be housed. In this case the shaft 23 is provided with a plurality of hook-shaped members 24, the position of which corresponding two by two with the position of the unlocking members for the different cassette formats. For most convenient way of operation, the recesses are carried out in such a way that whatever be the format of the cassettes which are unloaded, their front-edge all coincide in one sole plane.

Also a microswitch 41 is provided which is actuated during the upward movement of a roller such as roller 34 (FIG. 3) and which, in this case (see FIG. 6), may serve to energize a light source, contained in a casing 45. The tunnel 40 may be connected to the entry opening of the processing apparatus 42 by means of a connecting channel 44, adapted to fit the feed-plate 43 and the front wall of the processing apparatus 42 itself. The slanting position of the tunnel 40, in which the cassette may be unloaded, makes a film, contained in said cassette, to fall by gravity towards the entry roller pair (not shown) of said processing machine which will take care of its processing. For the purpose of facilitating the operation, a grip 38 is provided to push the platform 12 downwards. The casing 45 which is shown in FIG. 6 and illustrated more in detail in FIG. 7 contains a small printer which may be advantageously used in combination with an apparatus according to the invention. It is intended for the possible impressing or printing of additional information upon the film to be processed as the film leaves the cassette on the way to the processing apparatus 42. The printing of such information upon the film may be wanted when special radiographic techniques are employed. Moreover, any errors as to the name of the patient may be avoided or at least largely reduced when the patient's name is printed directly onto the film.

The printing device 45 (FIG. 7) comprises a housing 50. In the upper part a light source 46, preferably a flash-tube is provided. The light, emitted by the flash-lamp 46, upon ignition traverses a light-transparent support 48 onto which the information, to be printed on the film, may be placed. The light-intensity of a flash-lamp 46 is large enough to leave sufficient energy after the penetration of the light through a thin paper on which the information is typewritten.

The residual light then strikes the film 51 with the help of a small camera formed by the lower part of the housing and a diaphragm 49. In a sense the lower part of the housing is a pinhole camera. The reduced dimensions and the fact that continuous focussing is unnecessary, since the distance between the information bearing member and the film is always the same, permit the obtaining of sufficient sharpness of the final image on the film without necessity of lenses or other more complicated expedients. It is however clear that for optimizing the image quality such expedients may be used.

The mechanism for igniting the flash lamp 46 may be kept very simple. The simplified wiring diagram of a circuit capable of igniting the flash-lamp is represented in FIG. 8.

The circuit comprises the flash-lamp 46, and its associated housing 45, a DC-battery 47 and a pair of switches 39 and 41. It is to be understood that the battery 47 and both switches 39, 41 may be replaced by their equivalents.

So the battery 47 need not necessarily be a dry cell, but may comprise an AC operated circuit together with a rectifier and a charging capacitor which are sufficiently known in the art.

The switch 41 is a microswitch which detects the opening of the cassette, whereas switch 39 closes the circuit after, for example, the leading edge of the radiograhpic film has attanied a given position when it has left the cassette. Switch 39 may thus be a symbol for other means, such as an infrared sensor which is capable of accurately detecting the leading edge of the film without harm for the radiation-sensitive layer on it.

The circuit may be completed with additional devices. So there may be an auxiliary circuit which prevents the reignition of the light source before another film is presented at the detecting device. Such circuits form, however, no part of the invention and need therefore no further description.

Apart from the described electric circuit, the apparatus according to the invention may comprise supplementary logic enabling a clear control of the good functioning of the whole unit.

The apparatus may be used in horizontal or in inclined position. It is to be noted that, when the film has to be removed out of the cassette in horizontal position, a supplementary device for picking-up said film is necessary. Such a device is described, e.g. in our co-pending United Kingdom Patent Application No. 4656/73.

The apparatus described hereinbefore has proved to be a valuable tool in the art of radiography, by means of which a significant advance is made towards the daylight handling of radiographic film and the automatization of the processing of the latter.

We claim:

1. An unlocking and opening apparatus for radiographic film cassettes of the type having a bottom, a cover and a locking-unlocking mechanism actuated by exteriorly situated levers, which apparatus comprises
   a platform (11) for supporting a cassette for sliding movement along the surface thereof in a lengthwise direction,
   cassette advancing means (12) mounted on said platform (11) for back and forth relative movement in said lengthwise direction, said advancing means including fingers (17, 18) for engaging the rear end of a cassette resting on said platform and pushing said cassette along the platform as said advancing means is advanced,
   spaced apart cassette aligning and arresting means (13, 14) projecting above the platform surface at a locus intermediate its ends for engaging the cassette on said platform along its front edge and being movable relative to said platform,
   guide means (15, 16, 25) for guiding said aligning and arresting means in a direction parallel to said lengthwise direction from said locus toward the forward end of said platform,
   spring means connected to said aligning and arresting means for yieldably allowing said guided movement thereof as the advancing means is advanced to push said cassette and for returning said aligning and arresting means to said locus together with said cassette after opening, and
   means disposed forwardly of said locus for engaging the actuating levers of said cassette locking-unlocking mechanism as said cassette is pushed forward by said advancing means to unlock and open said cassette for removal of the film therefrom.

2. The apparatus of claim 1 including a housing enclosing said platform and having an entrance opening therein for introduction and removal of the cassette.

3. The apparatus of claim 1 wherein said platform is formed on its surface with a series of stepped recesses of varying widths for receiving cassettes of different widths.

4. An apparatus according to claim 1 including a yieldable pressure member for engaging the cassette cover during the movement thereof on said platform.

5. An apparatus according to claim 2, in which an element preventing the entry of light into the cassette is provided at the entrance opening of the housing.

6. An apparatus according to claim 5, in which the element preventing light to enter into the cassette is in the form of a closure plate carried by said feeding means.

7. An apparatus according to claim 1, in which said lever engaging means comprises a plurality of hook-shaped members.

8. An apparatus according to claim 1, in which said platform is supported in a position inclined from the horizontal.

* * * * *